United States Patent
Baer et al.

(10) Patent No.: US 8,066,893 B2
(45) Date of Patent: Nov. 29, 2011

(54) METHOD FOR CREATING A MAGNETIC WRITE POLE HAVING A STEPPED PERPENDICULAR POLE VIA CMP-ASSISTED LIFTOFF

(75) Inventors: Amanda Baer, Campbell, CA (US); Wen-Chien David Hsiao, San Jose, CA (US); John I. Kim, San Jose, CA (US); Yinshi Liu, Foster City, CA (US); Vladimir Nikitin, Campbell, CA (US); Trevor W. Olson, San Jose, CA (US); Hicham Moulay Sougrati, Burlingame, CA (US); Yuan Yao, Fremont, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 458 days.

(21) Appl. No.: 12/343,044

(22) Filed: Dec. 23, 2008

(65) Prior Publication Data
US 2010/0155366 A1    Jun. 24, 2010

(51) Int. Cl.
*B44C 1/22* (2006.01)
*B23P 15/00* (2006.01)
(52) U.S. Cl. ............. 216/22; 216/39; 360/313; 360/319
(58) Field of Classification Search .................... 216/22, 216/40
See application file for complete search history.

(56) References Cited

U.S. PATENT DOCUMENTS

| | | | |
|---|---|---|---|
| 6,399,148 B2 * | 6/2002 | Fukuroi et al. ................. | 427/131 |
| 6,776,917 B2 * | 8/2004 | Hsiao et al. ..................... | 216/88 |
| 6,901,651 B2 | 6/2005 | Sato et al. ................... | 29/603.07 |
| 7,155,809 B2 | 1/2007 | Sasaki et al. ................ | 29/603.12 |
| 7,446,049 B2 * | 11/2008 | Kim et al. ..................... | 438/706 |
| 2005/0007696 A1 * | 1/2005 | Chen et al. .................... | 360/126 |
| 2006/0077589 A1 * | 4/2006 | Sasaki et al. .................. | 360/126 |
| 2007/0041703 A1 * | 2/2007 | Wang ............................ | 385/147 |
| 2007/0206323 A1 | 9/2007 | Im et al. ........................ | 360/126 |

* cited by examiner

*Primary Examiner* — Binh X Tran
*Assistant Examiner* — Thomas Pham
(74) *Attorney, Agent, or Firm* — Zilka-Kotab, PC

(57) ABSTRACT

A method for manufacturing a magnetic write head having a stepped, recessed, high magnetic moment pole connected with a write pole. The stepped pole structure helps to channel magnetic flux to the write pole without leaking write field to the magnetic medium. This allows the write head to maintain a high write field strength at very small bit sizes. The method includes depositing a dielectric layer and a first CMP layer over substrate that can include a magnetic shaping layer. A mask is formed over the dielectric layer, the mask having an opening to define the stepped pole structure. The image of the mask is transferred into the dielectric layer. A high magnetic moment material is deposited and a chemical mechanical polishing is performed to planarize the magnetic material and dielectric layer.

21 Claims, 22 Drawing Sheets

METHOD FOR CREATING A MAGNETIC WRITE POLE HAVING A STEPPED PERPENDICULAR POLE VIA CMP-ASSISTED LIFTOFF

FIELD OF THE INVENTION

The present invention relates to perpendicular magnetic recording and more particularly to a method for manufacturing a write head having a stepped, recessed high magnetic moment layer beneath the write pole.

BACKGROUND OF THE INVENTION

The heart of a computer's long term memory is an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected circular tracks on the rotating disk. The read and write heads are directly located on a slider that has an air bearing surface (ABS). The suspension arm biases the slider toward the surface of the disk, and when the disk rotates, air adjacent to the disk moves along with the surface of the disk. The slider flies over the surface of the disk on a cushion of this moving air. When the slider rides on the air bearing, the write and read heads are employed for writing magnetic transitions to and reading magnetic transitions from the rotating disk. The read and write heads are connected to processing circuitry that operates according to a computer program to implement the writing and reading functions.

The write head has traditionally included a coil layer embedded in first, second and third insulation layers (insulation stack), the insulation stack being sandwiched between first and second pole piece layers. A gap is formed between the first and second pole piece layers by a gap layer at an air bearing surface (ABS) of the write head and the pole piece layers are connected at a back gap. Current conducted to the coil layer induces a magnetic flux in the pole pieces which causes a magnetic field to fringe out at a write gap at the ABS for the purpose of writing the aforementioned magnetic transitions in tracks on the moving media, such as in circular tracks on the aforementioned rotating disk.

In recent read head designs, a GMR or TMR sensor has been employed for sensing magnetic fields from the rotating magnetic disk. The sensor includes a nonmagnetic conductive layer, or barrier layer, sandwiched between first and second ferromagnetic layers, referred to as a pinned layer and a free layer. First and second leads are connected to the sensor for conducting a sense current therethrough. The magnetization of the pinned layer is pinned perpendicular to the air bearing surface (ABS) and the magnetic moment of the free layer is located parallel to the ABS, but free to rotate in response to external magnetic fields. The magnetization of the pinned layer is typically pinned by exchange coupling with an antiferromagnetic layer.

The thickness of the spacer layer is chosen to be less than the mean free path of conduction electrons through the sensor. With this arrangement, a portion of the conduction electrons is scattered by the interfaces of the spacer layer with each of the pinned and free layers. When the magnetizations of the pinned and free layers are parallel with respect to one another, scattering is minimal and when the magnetizations of the pinned and free layer are antiparallel, scattering is maximized. Changes in scattering alter the resistance of the spin valve sensor in proportion to $\cos \Theta$, where $\Theta$ is the angle between the magnetizations of the pinned and free layers. In a read mode the resistance of the spin valve sensor changes proportionally to the magnitudes of the magnetic fields from the rotating disk. When a sense current is conducted through the spin valve sensor, resistance changes cause potential changes that are detected and processed as playback signals.

In order to meet the ever increasing demand for improved data rate and data capacity, researchers have recently been focusing their efforts on the development of perpendicular recording systems. A traditional longitudinal recording system, such as one that incorporates the write head described above, stores data as magnetic bits oriented longitudinally along a track in the plane of the surface of the magnetic disk. This longitudinal data bit is recorded by a fringing field that forms between the pair of magnetic poles separated by a write gap.

A perpendicular recording system, by contrast, records data as magnetizations oriented perpendicular to the plane of the magnetic disk. The magnetic disk has a magnetically soft underlayer covered by a thin magnetically hard top layer. The perpendicular write head has a write pole with a very small cross section and a return pole having a much larger cross section. A strong, highly concentrated magnetic field emits from the write pole in a direction perpendicular to the magnetic disk surface, magnetizing the magnetically hard top layer. The resulting magnetic flux then travels through the soft underlayer, returning to the return pole where it is sufficiently spread out and weak that it will not erase the signal recorded by the write pole when it passes back through the magnetically hard top layer on its way back to the return pole.

SUMMARY OF THE INVENTION

The present invention provides a method for manufacturing a magnetic write head having a high magnetic moment, stepped, recessed magnetic pole. The method includes providing a substrate, depositing a layer of dielectric material over the substrate and depositing a first CMP stop layer over the layer of dielectric material. A mask structure is formed over the first CMP stop layer, the mask structure having an opening configured to define a stepped pole structure. The image of the mask structure is transferred onto the underlying first CMP stop layer and the dielectric layer. A magnetic material is then deposited, and a second CMP stop layer is deposited over the magnetic material. The mask structure is then removed and a chemical mechanical polishing process is performed.

The above process can be used to form a stepped, recessed pole structure. The opening in the mask structure can be configured so that it does not extend to the ABS plane. After the above process has been used to form a stepped pole structure, a write pole can be formed over the stepped, recessed pole structure.

These and other features and advantages of the invention will be apparent upon reading of the following detailed description of preferred embodiments taken in conjunction with the Figures in which like reference numerals indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

DETAILED DESCRIPTION OF THE EMBODIMENTS

The following description is of the best embodiments presently contemplated for carrying out this invention. This description is made for the purpose of illustrating the general principles of this invention and is not meant to limit the inventive concepts claimed herein.

Figure 1:
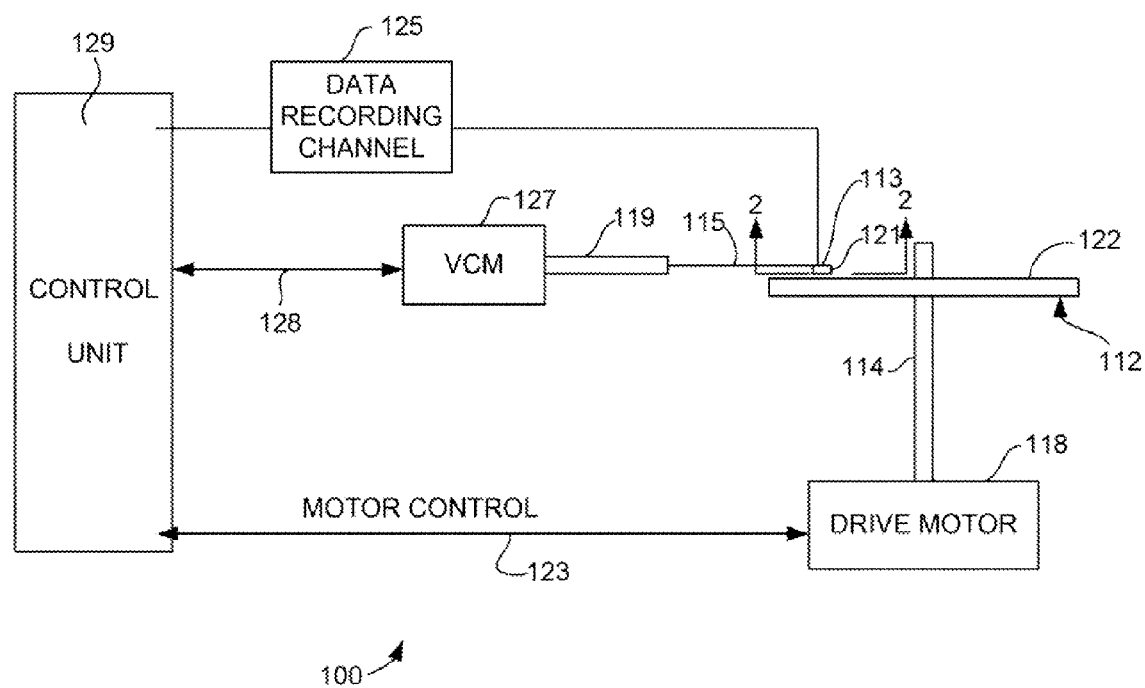
FIG. 1 is a schematic illustration of a disk drive system in which the invention might be embodied.

Referring now to FIG. 1, there is shown a disk drive 100 embodying this invention. As shown in FIG. 1, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, slider 113 moves radially in and out over the disk surface 122 so that the magnetic head assembly 121 may access different tracks of the magnetic disk where desired data are written. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of the magnetic disk 112 generates an air bearing between the slider 113 and the disk surface 122 which exerts an upward force or lift on the slider. The air bearing thus counter-balances the slight spring force of suspension 115 and supports slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

Figure 2:
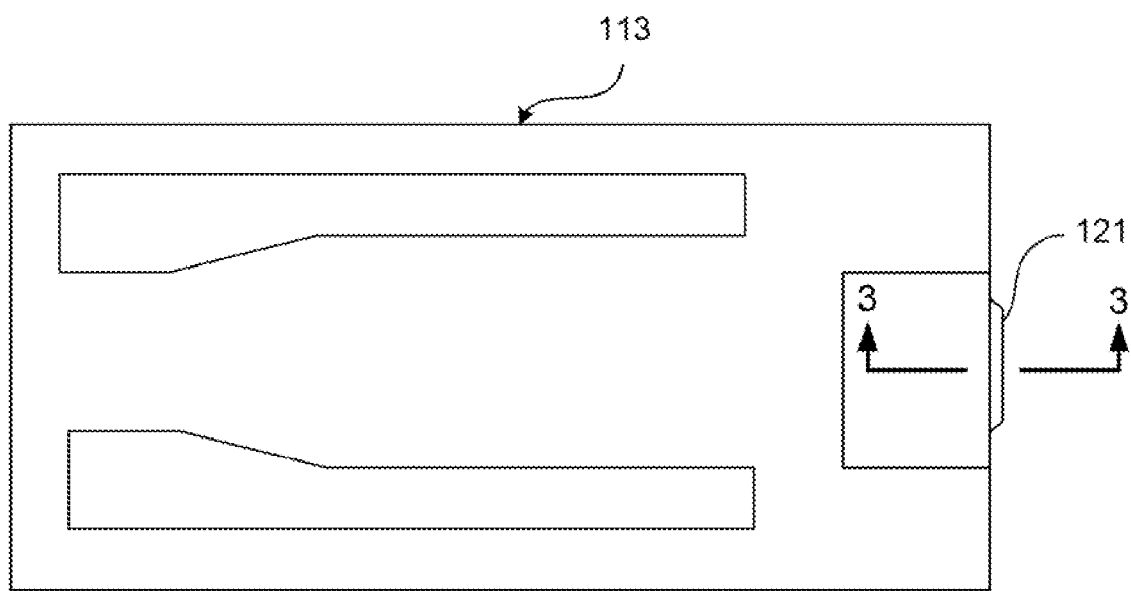
FIG. 2 is an ABS view of a slider, taken from line 2-2 of FIG. 1, illustrating the location of a magnetic head thereon.

With reference to FIG. 2, the orientation of the magnetic head 121 in a slider 113 can be seen in more detail. FIG. 2 is an ABS view of the slider 113, and as can be seen the magnetic head including an inductive write head and a read sensor, is located at a trailing edge of the slider. The above description of a typical magnetic disk storage system, and the accompanying illustration of FIG. 1 are for representation purposes only. It should be apparent that disk storage systems may contain a large number of disks and actuators, and each actuator may support a number of sliders.

Figure 3:
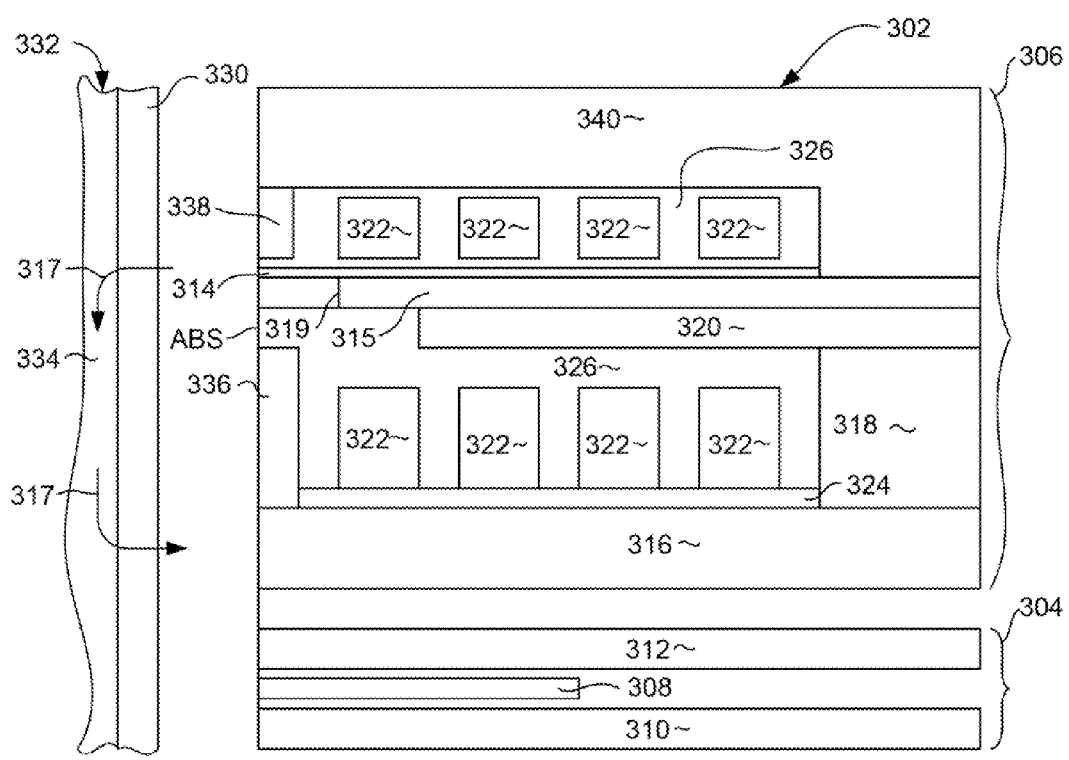
FIG. 3 is a cross sectional view of a magnetic head, taken from line 3-3 of FIG. 2 and rotated 90 degrees counterclockwise, of a magnetic write head according to an embodiment of the present invention.

With reference now to FIG. 3, the invention can be embodied in a magnetic head 302. The magnetic head 302 includes a read head 304 and a write head 306. The read head 304 includes a magnetoresistive sensor 308, which can be a GMR, TMR, or some other type of sensor. The magnetoresistive sensor 308 is located between first and second magnetic shields 310, 312.

The write head 306 includes a magnetic write pole 314 and a magnetic return pole 316. The write pole 314 can be constructed of a lamination of magnetic layers separated by thin non-magnetic layer, and can be formed upon a stepped, high magnetic moment, recessed magnetic pole structure 315. The stepped, high magnetic moment, recessed magnetic pole structure can be magnetically connected with a magnetic shaping layer 320, which can magnetically connected with the return pole 316 via a magnetic back gap layer 318 formed at the back of the write head 306 away from the air bearing surface (ABS). The write pole 314, stepped, recessed pole structure 315, back gap 318 and return pole 316 together form a magnetic yoke structure.

A write coil 322 (shown in cross section in FIG. 3) passes between the write pole and shaping layer 314, 320 and the return pole 316, and may also pass above the write pole 314 and shaping layer 320. The write coil can be a helical coil or can be one or more pancake coils. The write coil 322 can be formed upon an insulation layer 324 and can be embedded in a coil insulation layer 326 such as alumina and or hard baked photoresist.

In operation, when an electrical current flows through the write coil 322, a resulting magnetic field causes a magnetic flux to flow through the return pole 316, back gap 318, shaping layer 320 and write pole 314. This causes a magnetic write field 317 to be emitted from the tip of the write pole 314 toward a magnetic medium 332. The write pole 314 has a cross section at the ABS that is much smaller than the cross section of the return pole 316 at the ABS. Therefore, the magnetic field 317 emitting from the write pole 314 is sufficiently dense and strong that it can write a data bit to a magnetically hard top layer 330 of the magnetic medium 332. The magnetic flux resulting from the write field 317 then flows through a magnetically softer under-layer 334, and returns back to the return pole 316, where it is sufficiently spread out and week that it does not erase the data bit recorded by the write head 314. A magnetic pedestal 336 can be provided at the ABS, and attached to the leading return pole 316 to act as a magnetic shield to prevent stray field from the write coil 322 from inadvertently reaching the magnetic media 332.

In order to increase write field gradient, and therefore, increase the speed with which the write head 306 can write data, a trailing, magnetic shield 338 can be provided. The trailing, magnetic shield 338 is separated from the write pole by a non-magnetic write gap 339, and may be connected with the shaping layer 320 and/or back gap 318 by a trailing return pole 340. The trailing shield 338 attracts the magnetic field from the write pole 314, which slightly cants the angle of the magnetic field emitting from the write pole 314. This canting of the write field increases the speed with which write field polarity can be switched by increasing the field gradient. The non-magnetic trailing gap layer 339 can be constructed of a material such as Rh, Ir or Ta.

The physical parameter reductions required of the write head in order to increase data density, such as reduction in the dimensions of the write pole 314 result in reduced write field. The presence of the stepped, high magnetic moment pole structure 315 advantageously provides increased write field, with decreased dimensions of the write pole 314. The stepped pole structure can be constructed of a high magnetic moment (high Bsat) material such as CoFe. However, the front edge 319 of the stepped pole structure 315 is recessed from the ABS so there is no increase in effective write pole size at the ABS. For example, because the front edge 317 of the stepped pole structure 315 is recessed form the ABS, the distance from the leading edge to trailing edge of the write pole 314 is not increased. A small bit length can therefore, be maintained for increased data density.

In order to maximize write field to the tip of the write pole, while also preventing write field from leaking from the leading edge 319 of the stepped pole structure to the magnetic medium 330 the distance between ABS and the front edge 319 must be carefully controlled. Previously, no method has been proposed that defines this front edge 319 with sufficient accuracy to effectively utilize such a stepped pole structure 315.

With reference to FIGS. 4-18, a method is described for manufacturing a magnetic write head 306 having a stepped magnetic pole structure 315 (FIG. 3). This method allows for very accurate definition of the stepped pole structure 315 and write pole 314 thereon.

Figure 4:
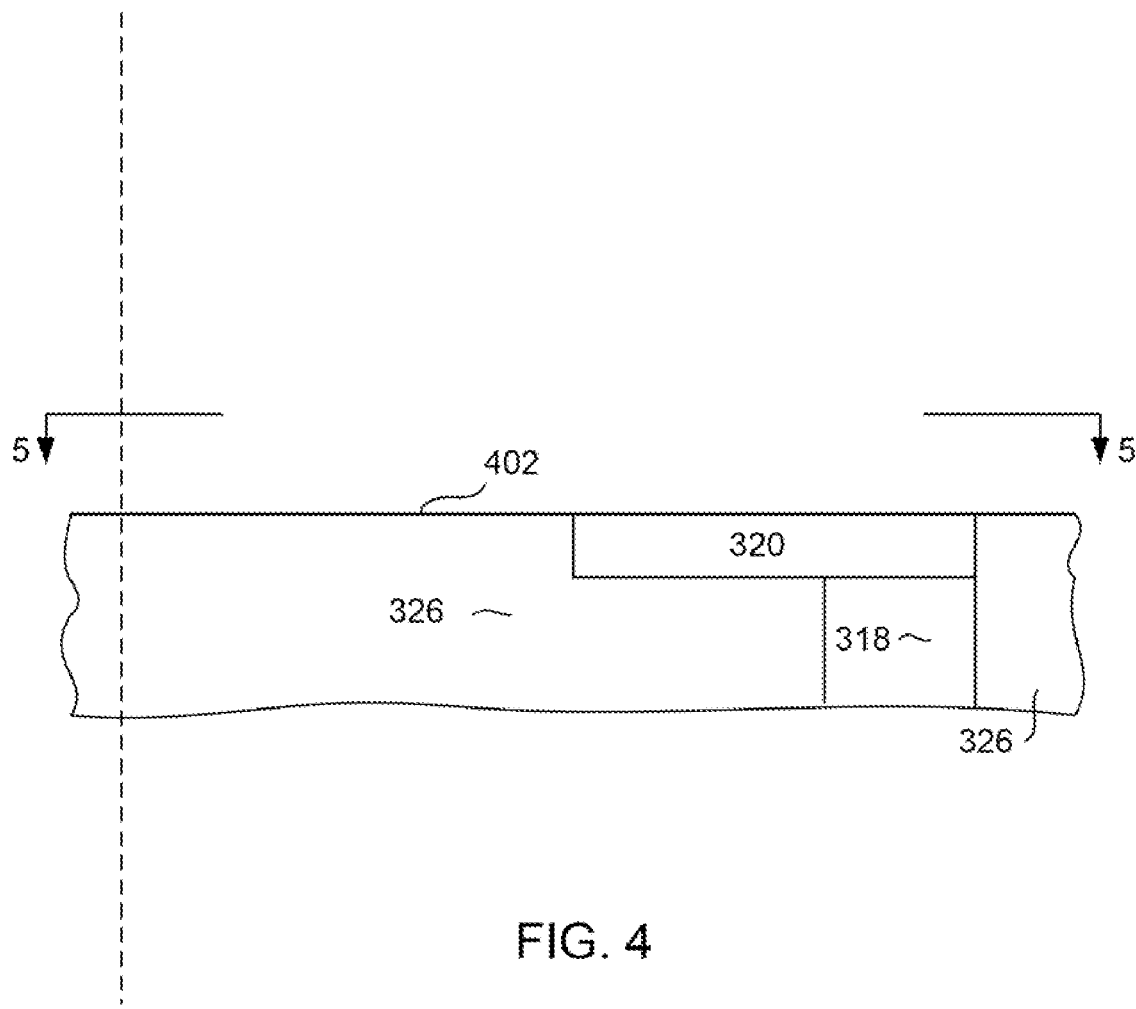
FIGS. 4-18 are cross sectional and top down views of a portion of a write head in various intermediate stages of manufacture illustrating a method for manufacturing a magnetic write head according to an embodiment of the invention.
Figure 5:
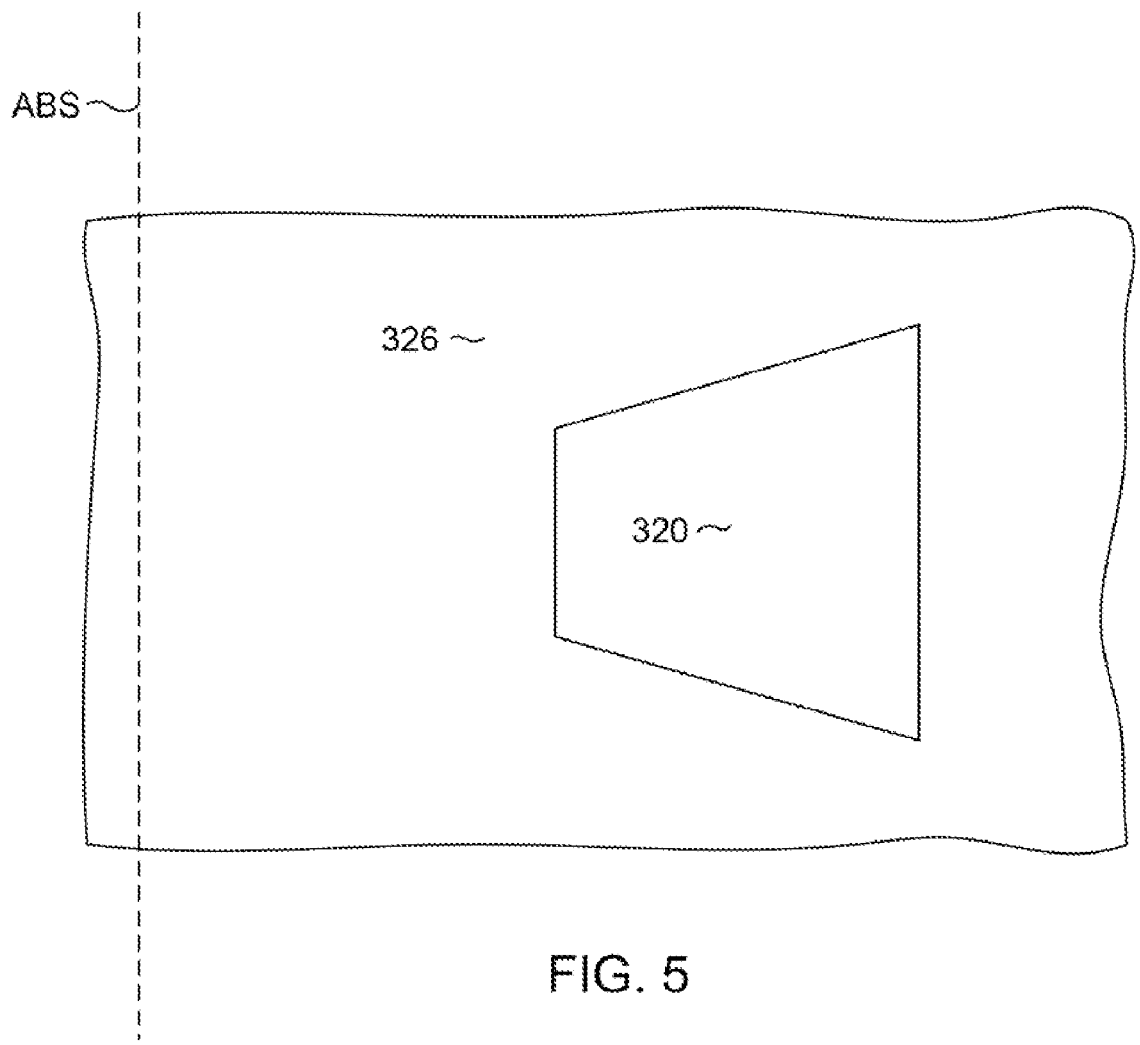

With particular reference to FIG. 4, a magnetic shaping layer 320 constructed of a magnetic material such as NiFe is formed on a substrate that includes the magnetic back gap layer 318 and the insulation fill layer 326. The shaping layer 320, a top down view of which can be seen in FIG. 5, can be surrounded by the insulation layer 326. The shaping layer 320 and insulation layer 326 form a co-planar substrate surface 402. This planar surface 402 can be formed by a chemical mechanical polishing process.

Figure 6:
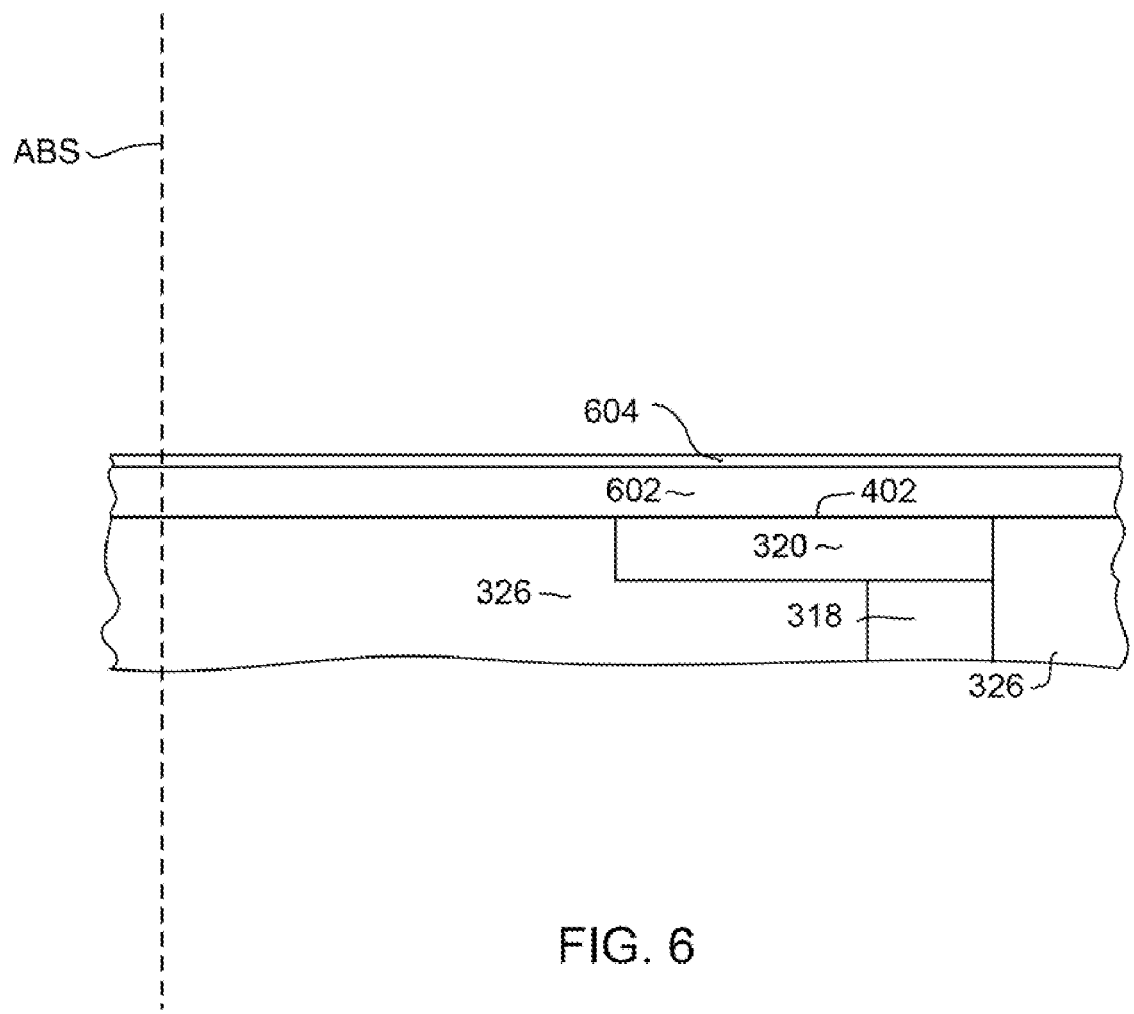

With reference now to FIG. 6 a layer of dielectric material 602 is deposited over the substrate surface 402. The dielectric material 602 is preferably alumina, and can be deposited to a thickness that is chosen to define a thickness of the stepped pole structure 315 (FIG. 3). For example, the dielectric layer 602 can be 50-100 nm thick. A layer of material that is resistant to chemical mechanical polishing (first CMP stop layer) 604 is deposited over the fill layer 602. The first CMP stop layer 604 can be a material such as diamond-like carbon (DLC), Ir, Rh or Ru.

Figure 7:
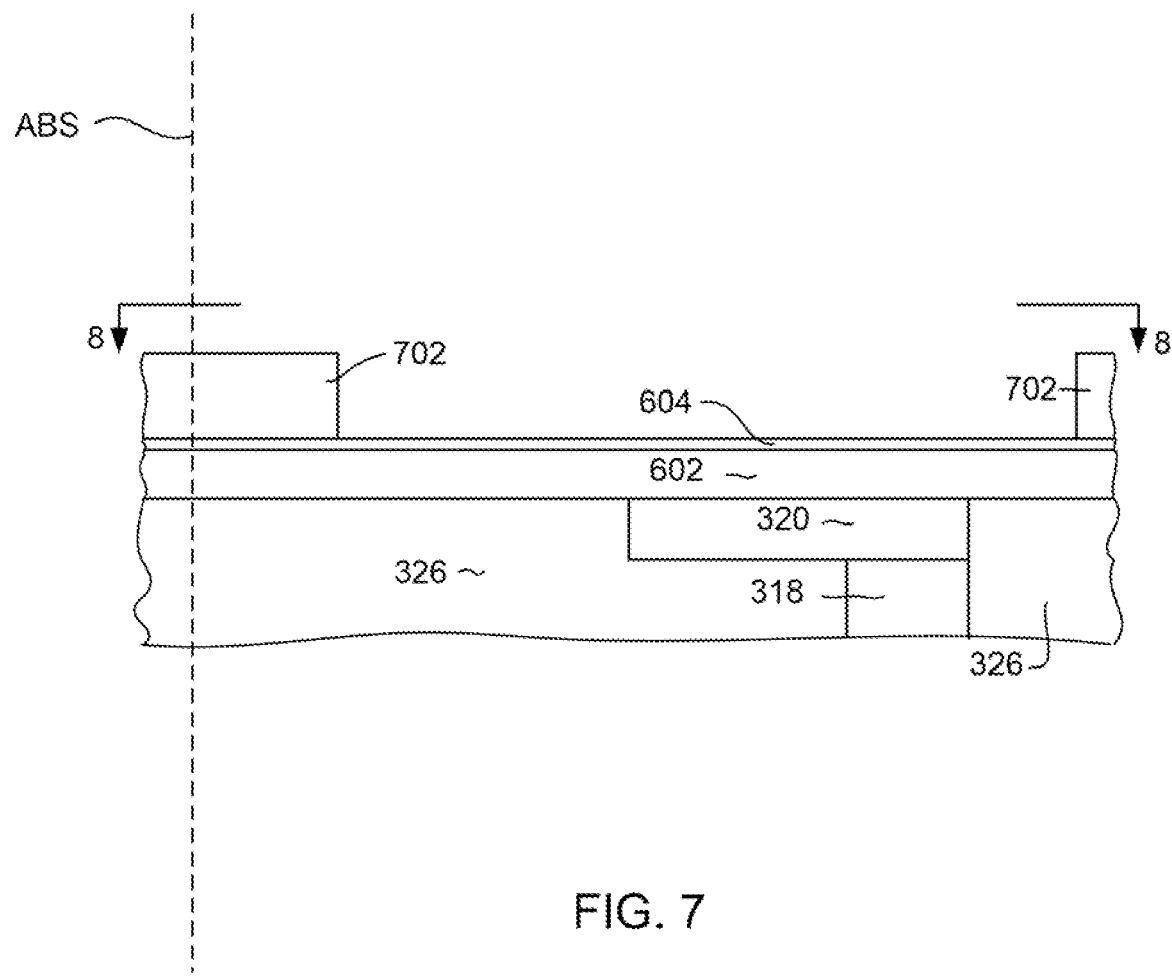
Figure 8:
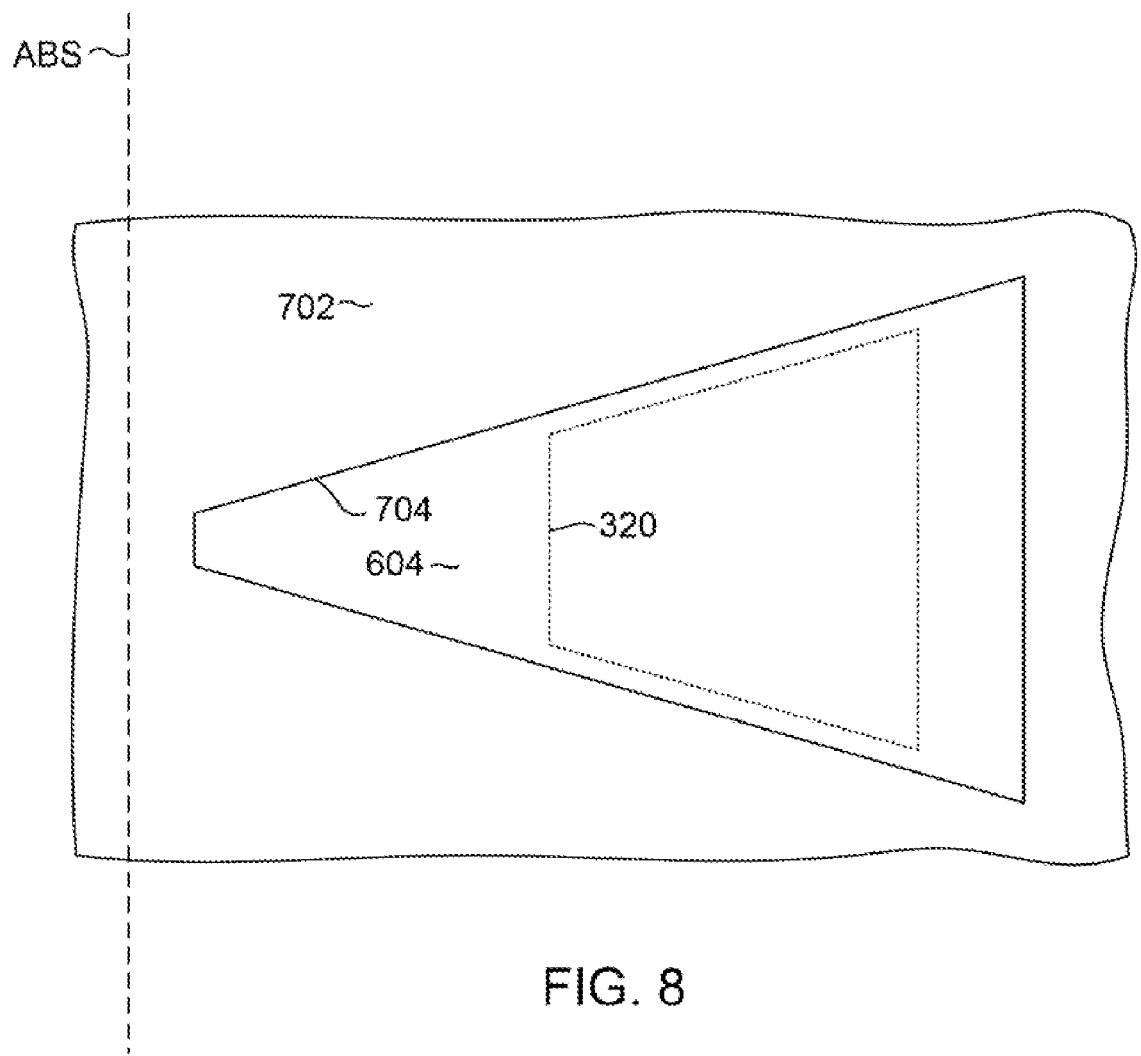

With reference now to FIG. 7, a mask structure 702 is formed over the dielectric layer 602 and CMP stop layer 604. The mask structure can be constructed of a photolithographically patterned photoresist, and can include other materials such as a hard mask layer, anti-reflective coating, etc. The mask structure 702 has an opening 704 that is configured to define the shape of a desired stepped pole structure 315 (FIG. 3). The shape of the opening 704 can be seen more clearly with reference to FIG. 8, which shows a top-down view, as viewed from line 8-8 of FIG. 7. As can be seen, the mask opening 704 in the mask structure 702 does not extend to the predetermined air bearing surface plane ABS. This design is so the resulting stepped pole structure 315 (FIG. 3) will be recessed from the ABS in the finished write head. In FIG. 8, a possible shape of the shaping layer 320 (hidden beneath the layers 602, 604) is shown in dotted line.

Figure 9:
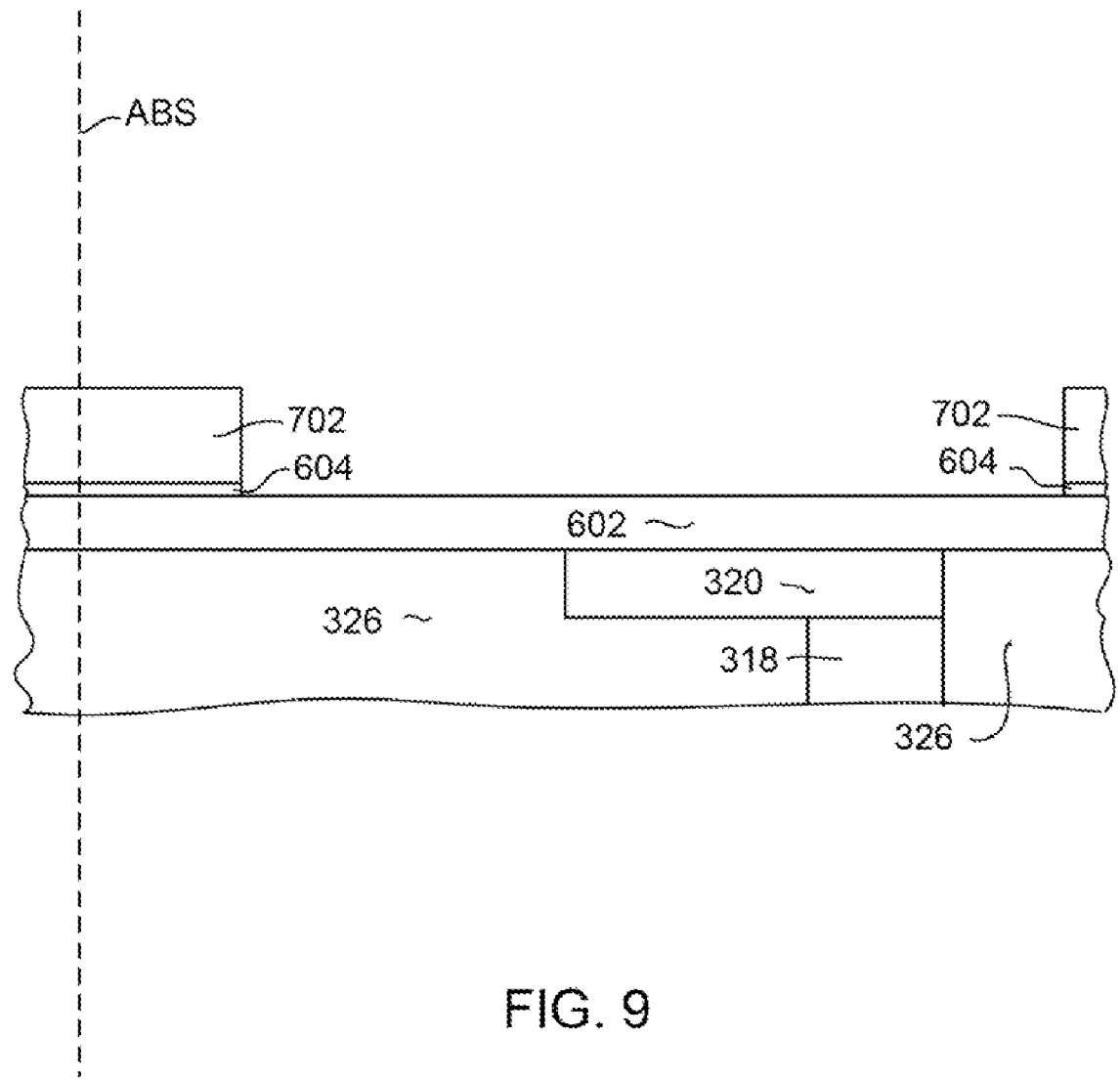

With reference now to FIG. 9, a material removal process such as reactive ion etching (RIE) or ion milling can be performed to remove portions of the first CMP stop layer that are not protected by the mask 702. This exposes the dielectric layer 602.

Figure 10:
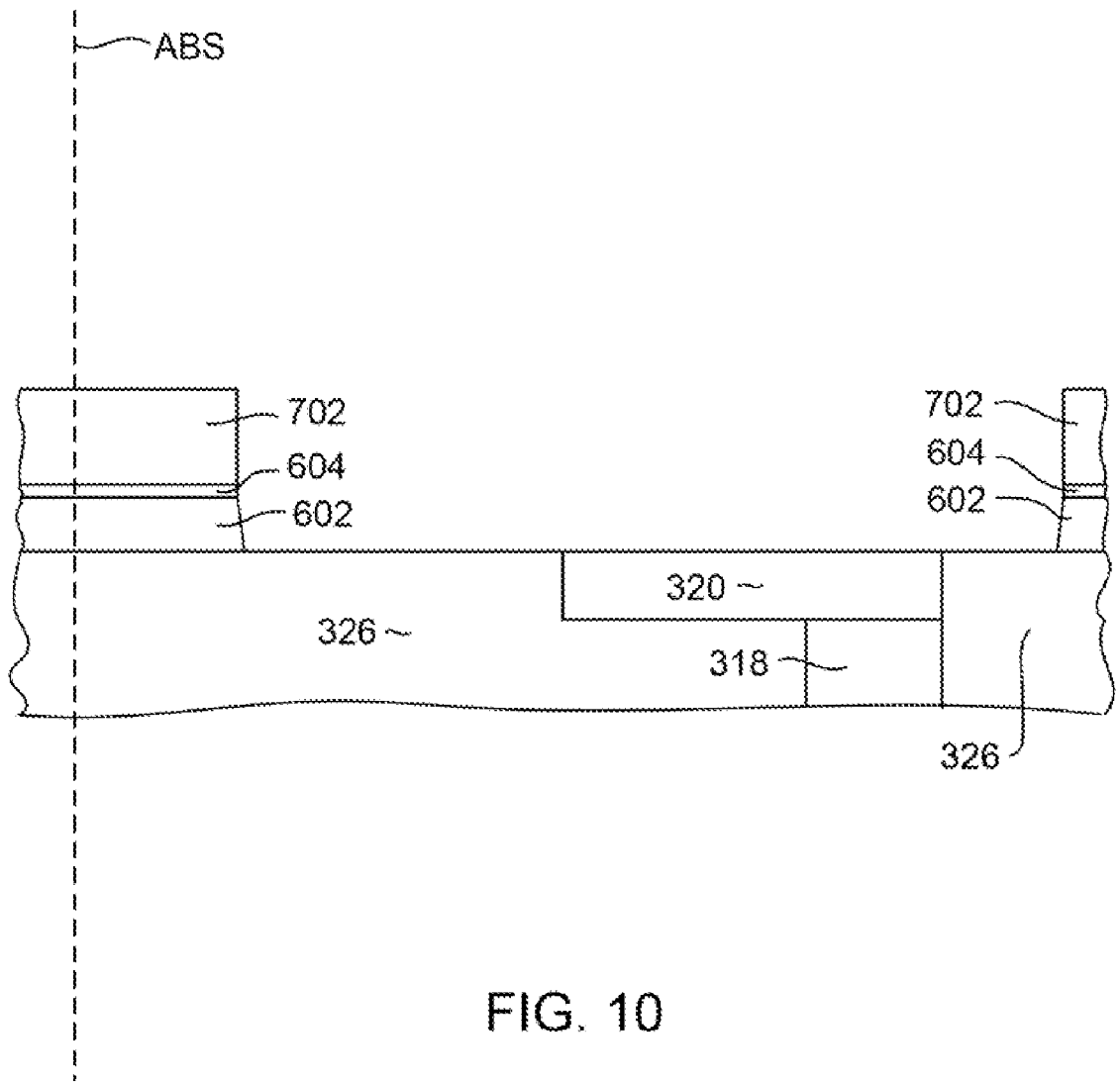
Figure 11:
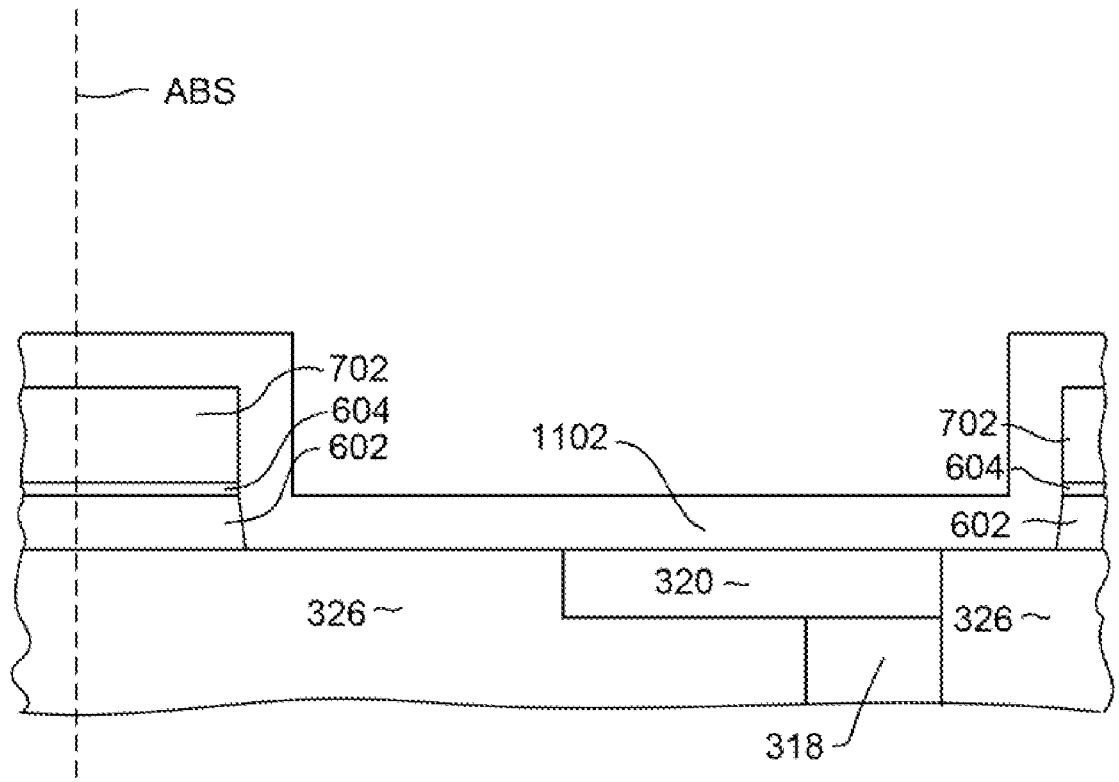
Figure 12:
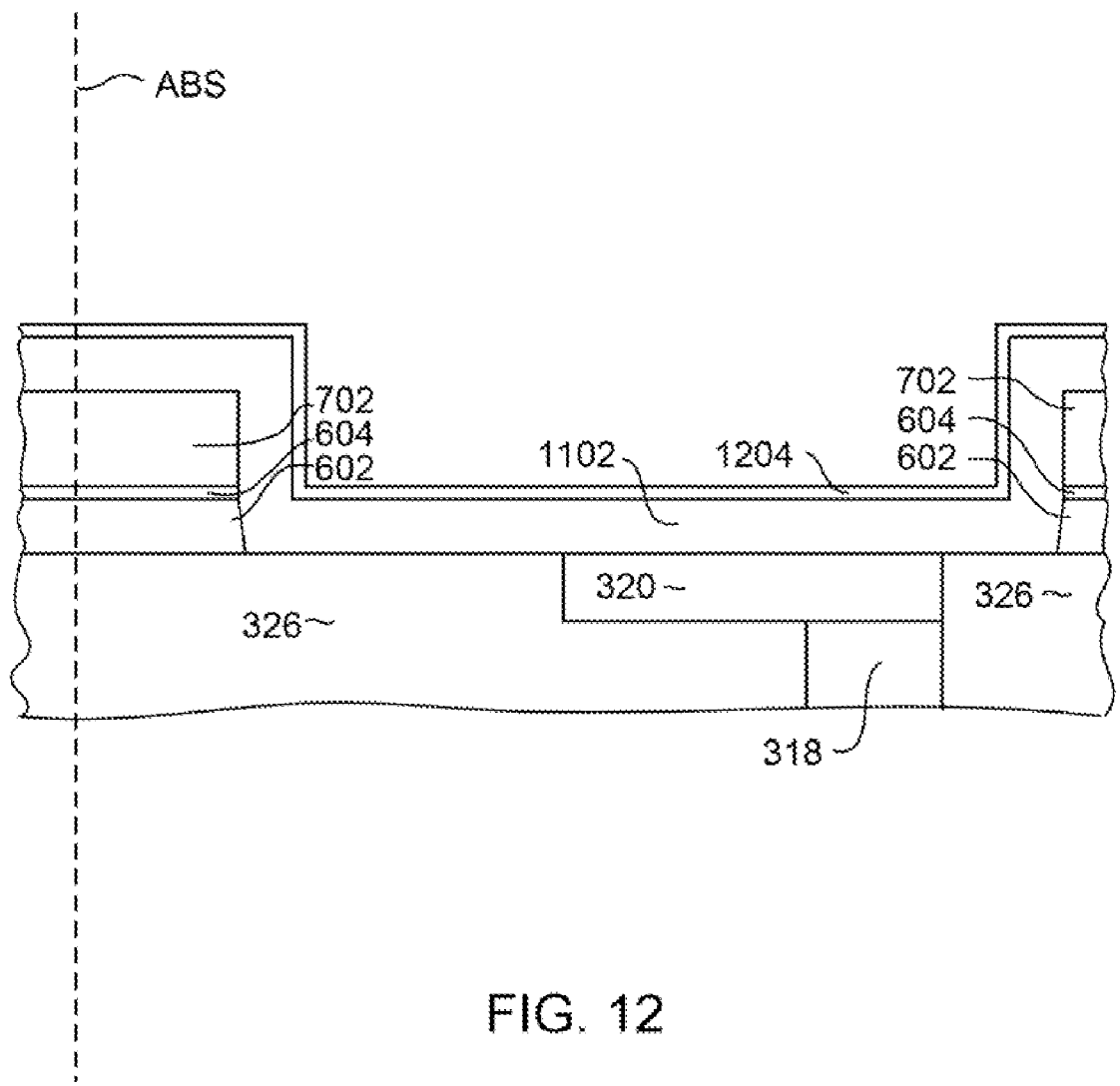

Then, with reference to FIG. 10, a further material removal process is performed to remove portions of the dielectric layer 602 that are not protected by the mask 702. This can be a continuation of the same material removal process used to remove the first CMP stop layer 604, or could be a different process, depending upon whether or not ion milling was used to remove the CMP stop layer 604. Then, with reference to FIG. 11, a layer of high magnetic moment (High Bsat) material such as CoFe, CoFeN or $Ni_{22}Fe_{78}$ 1102 is deposited. The layer 1102 is preferably deposited to a thickness that is chosen to define a thickness of the stepped pole structure 315 described above with reference to FIG. 3. The high moment material layer 1102 is preferably deposited to a thickness that is substantially equivalent to the thickness of the dielectric layer 602, such as 50-60 nm. A second layer of material that is resistant to chemical mechanical polishing (second CMP layer) 1202 is then deposited over the high moment magnetic material 1102, resulting in the structure shown in FIG. 12.

Figure 13:
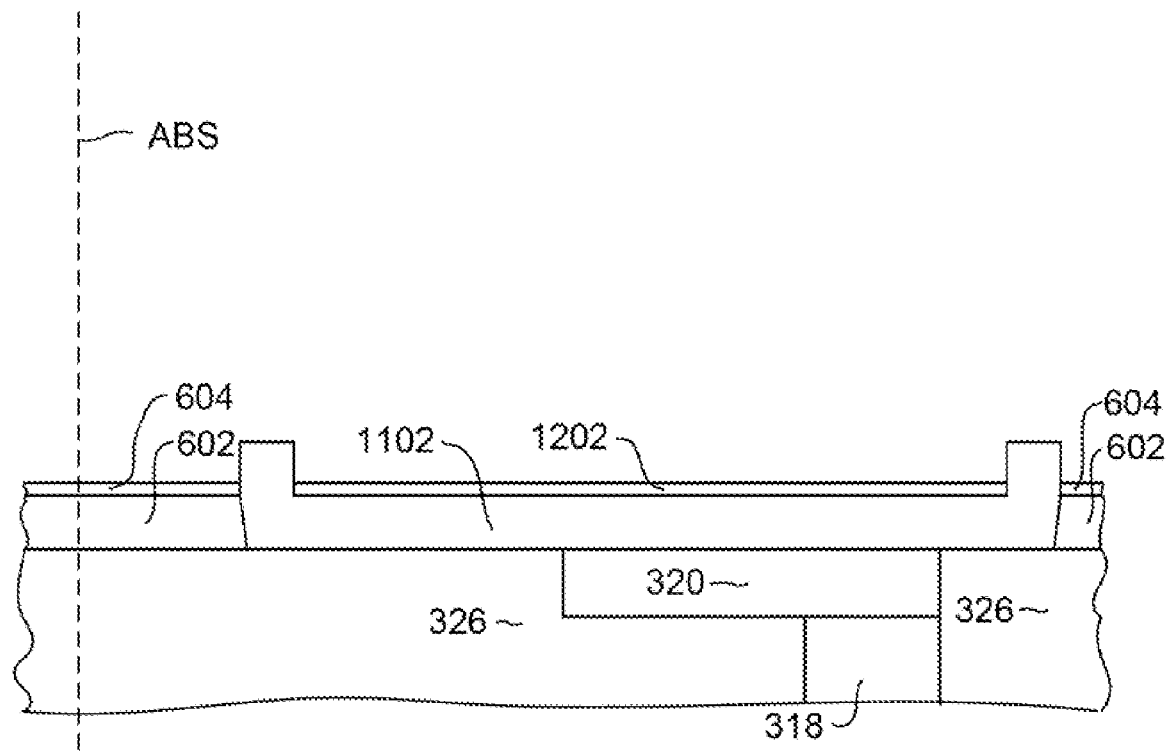
Figure 14:
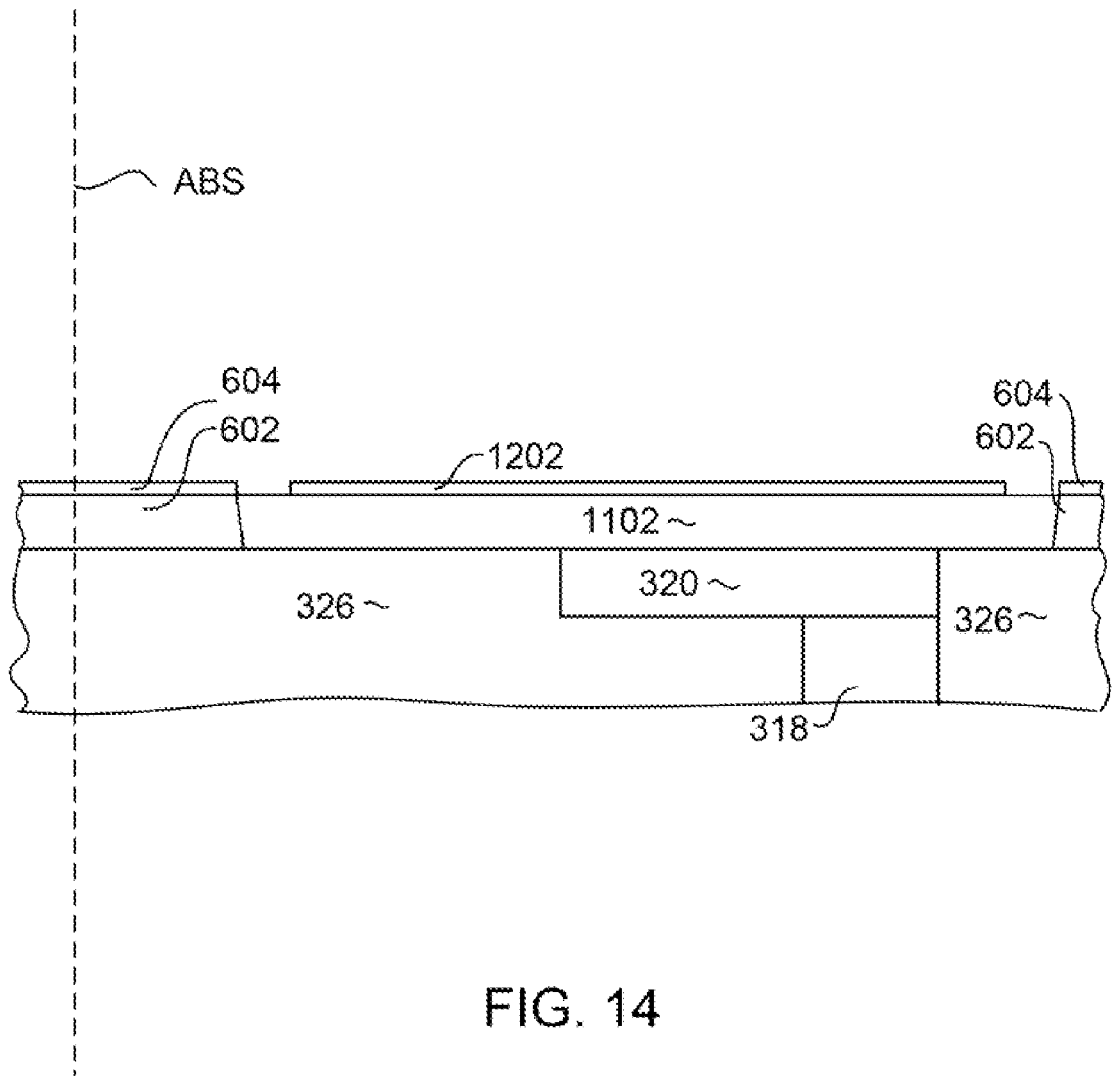
Figure 15:
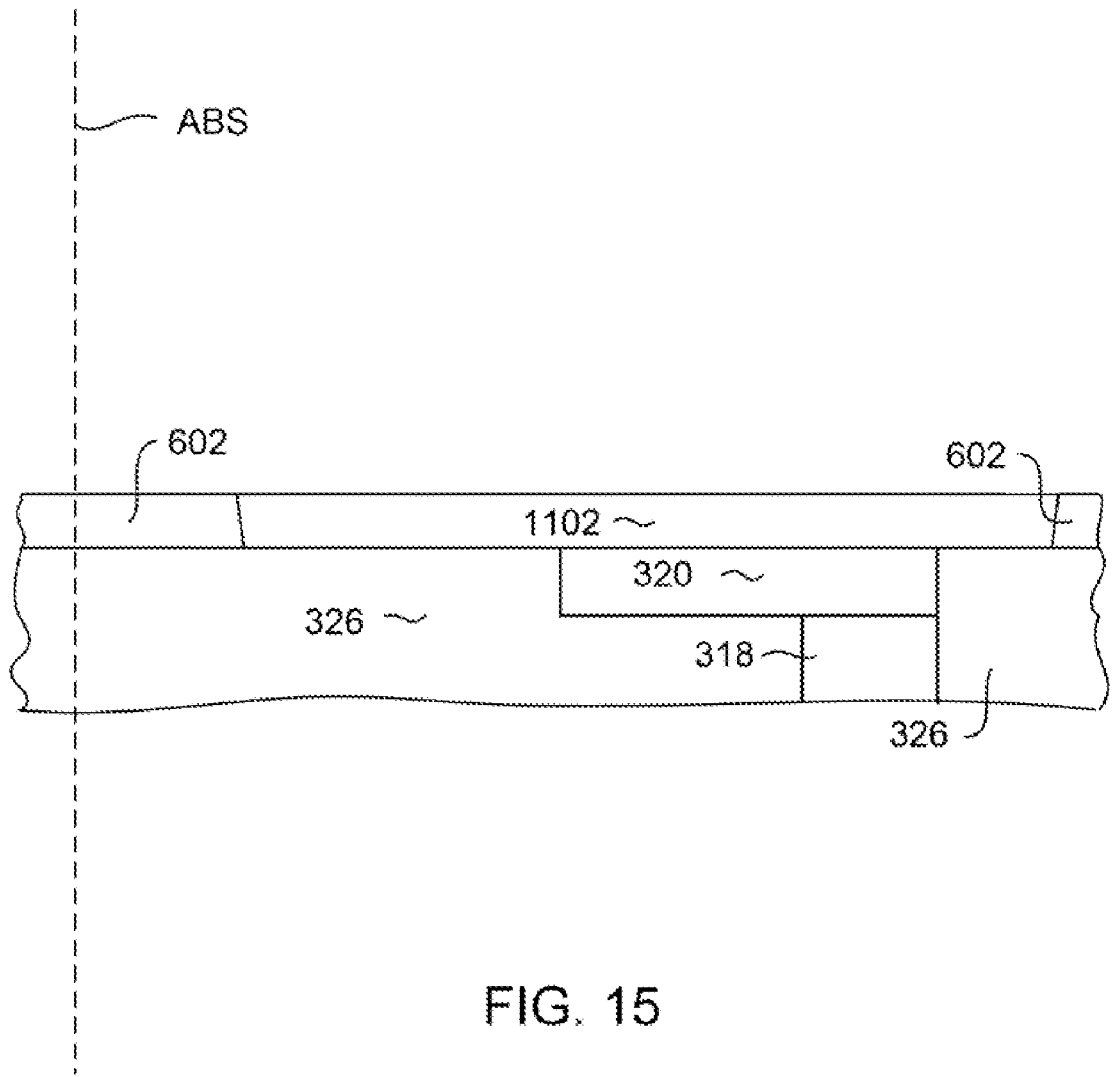

The mask 702 and excess magnetic material 1102 can then be lifted off, leaving a structure such as shown in FIG. 13. The mask liftoff can be performed, for example, by submersion in a hot N-Methyl-2-pyrrolidone (hot NMP) solution, with mechanical action such as ultrasonic agitation or high-pressure nozzle spray. Then, a chemical mechanical polishing process (CMP) can be performed, resulting in the structure shown in FIG. 14. Remaining portions of the first and second CMP stop layers 604, 1202 can then be removed by a material removal process such as ion milling or reactive ion etching (preferably reactive ion etching), resulting in a structure such as that shown in FIG. 15. The remaining high moment magnetic material 1102 forms the stepped pole structure 315 described above in FIG. 3. The CMP process advantageously forms a planar surface on which a write pole can be formed as will be described herein below.

Figure 16:
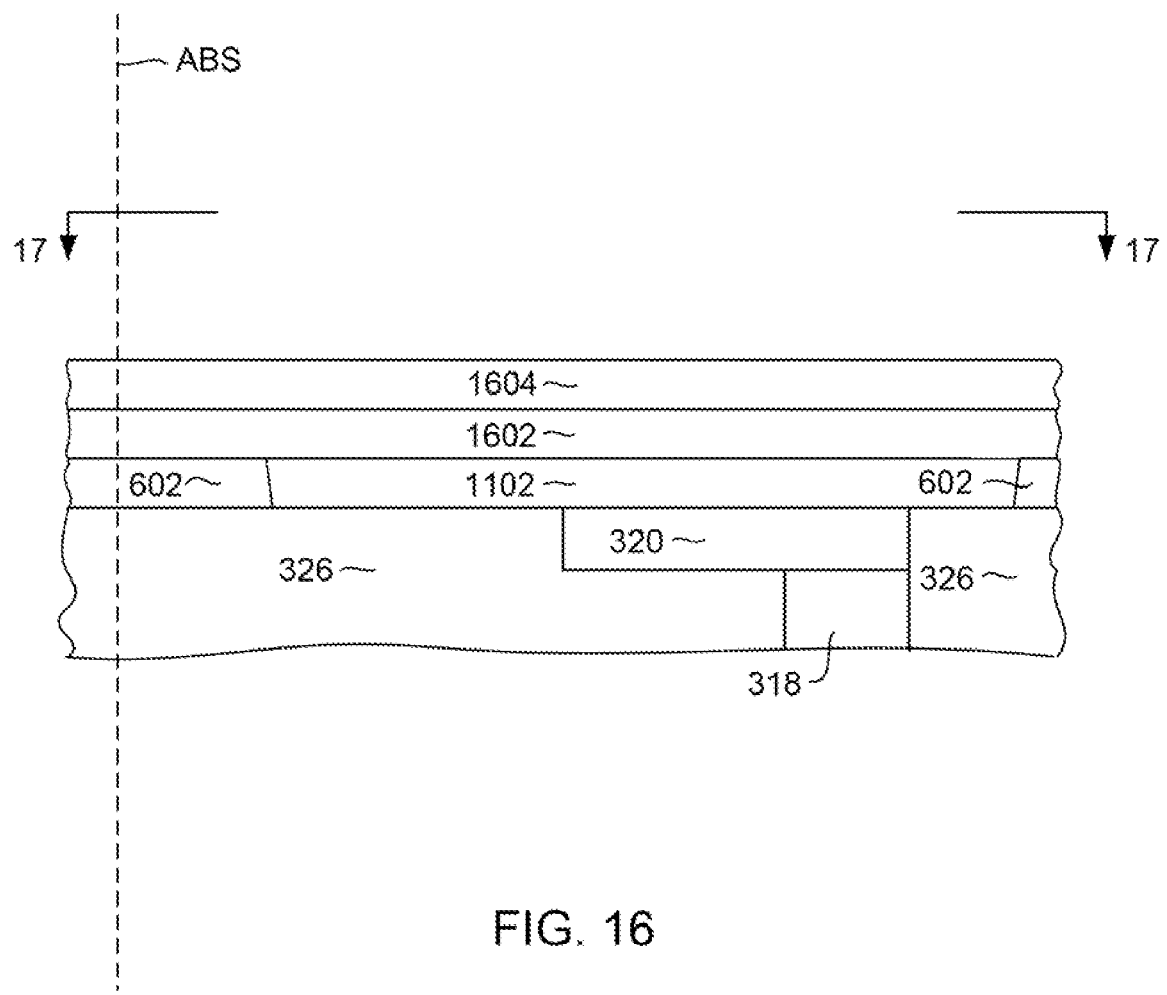

With reference now to FIG. 16, a magnetic write pole material 1602 is deposited over the high magnetic moment material 1102 (steppe pole 315) and dielectric layer 602. The write pole material can be a lamination of high moment material such as CoFe separated by thin non-magnetic layers. A masking layer 1604 is then deposited over the magnetic write pole material 1602. The masking layer 1604 can actually include several layers, such as one or more hard mask layers, an image transfer layer, an anti-reflective coating layer and a photoresist.

Figure 17:
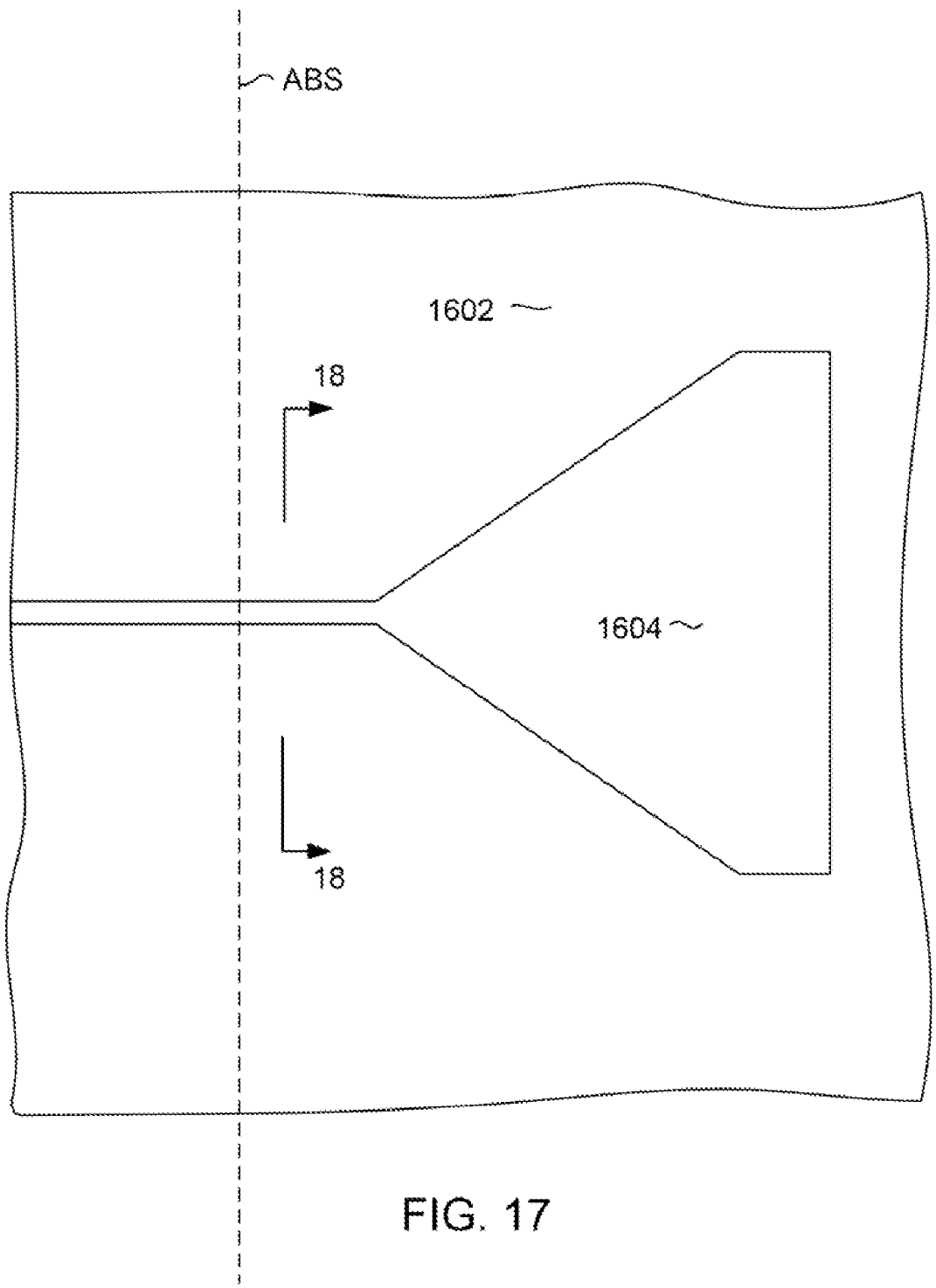
Figure 18:
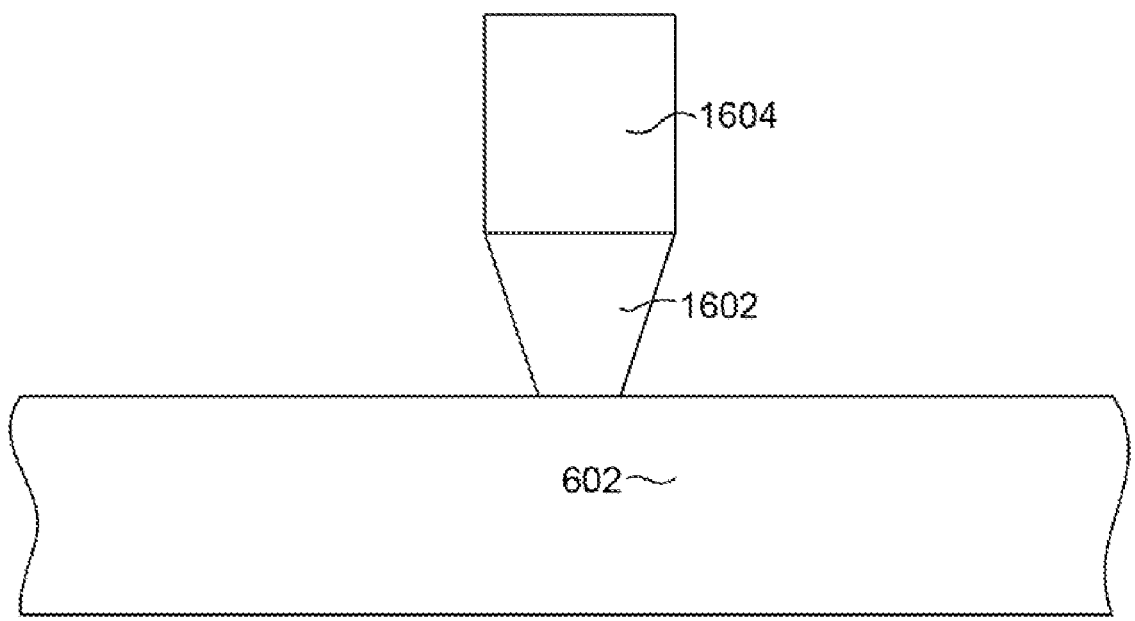

The mask layers 1604 are then patterned to define a write pole shape, as seen more clearly with reference to FIG. 17 which shows a top down view of the patterned mask 1604. The patterning can include photolithographic patterning of the photoresist layer and one or more reactive ion etching and or ion milling steps to transfer the image of the photoresist layer onto any underlying mask layers.

A write pole can then be formed by performing an ion milling operation to remove portions of the write pole material 1602 that are not protected by the patterned mask structure 1604. The ion milling can be performed at one or more angles relative to normal in order to form the write pole tip with a tapered, trapezoidal shape. This can be seen with reference to FIG. 18, which shows a cross sectional view, taken from line 18, 18 of FIG. 17, showing a plane parallel with the air bearing surface ABS.

Figure 19:
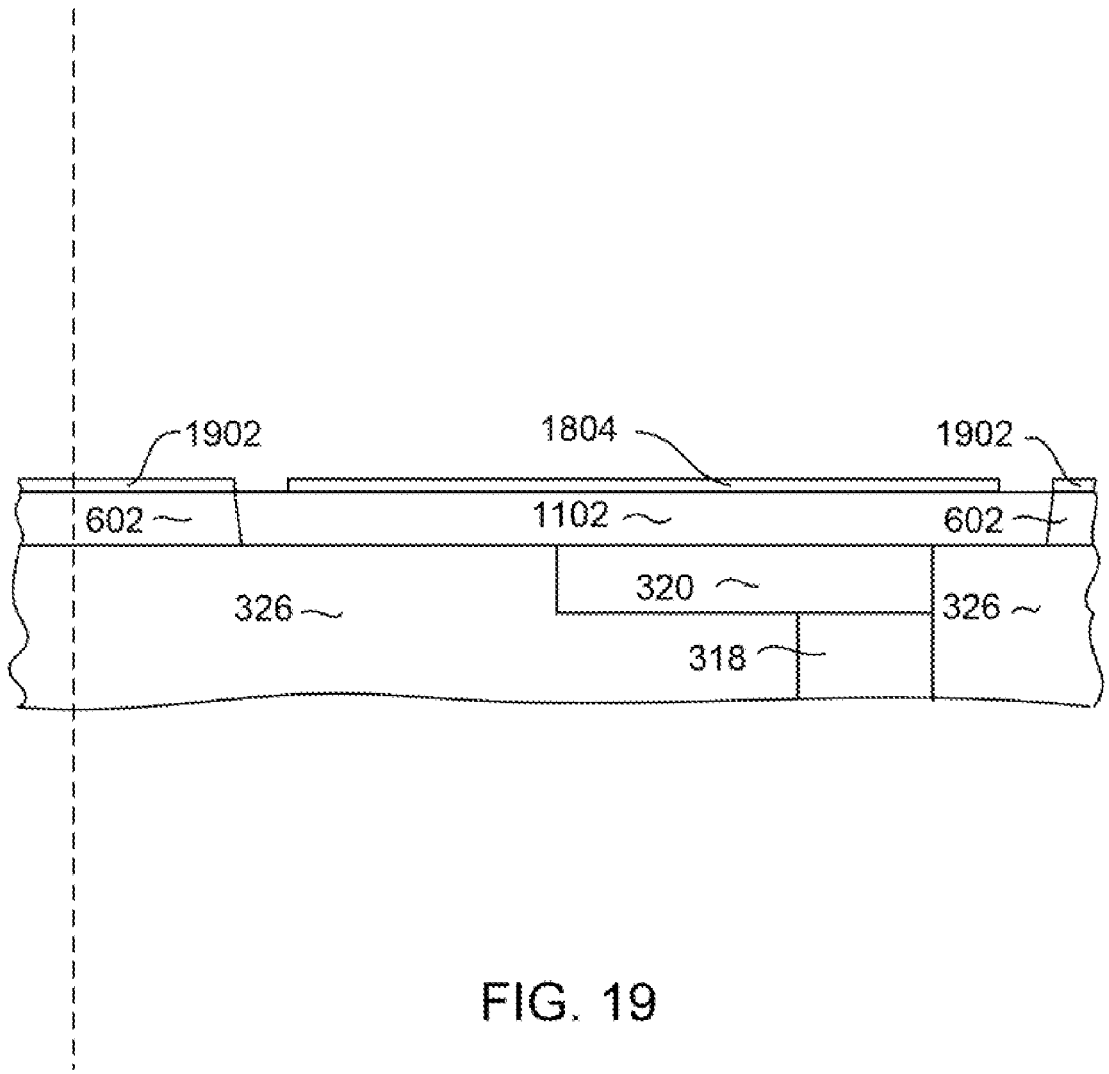
FIGS. 19-22 are cross sectional and top down views of a portion of a write head in various intermediate stages of manufacture illustrating a method for manufacturing a write head according to an alternate embodiment of the invention.
Figure 20:
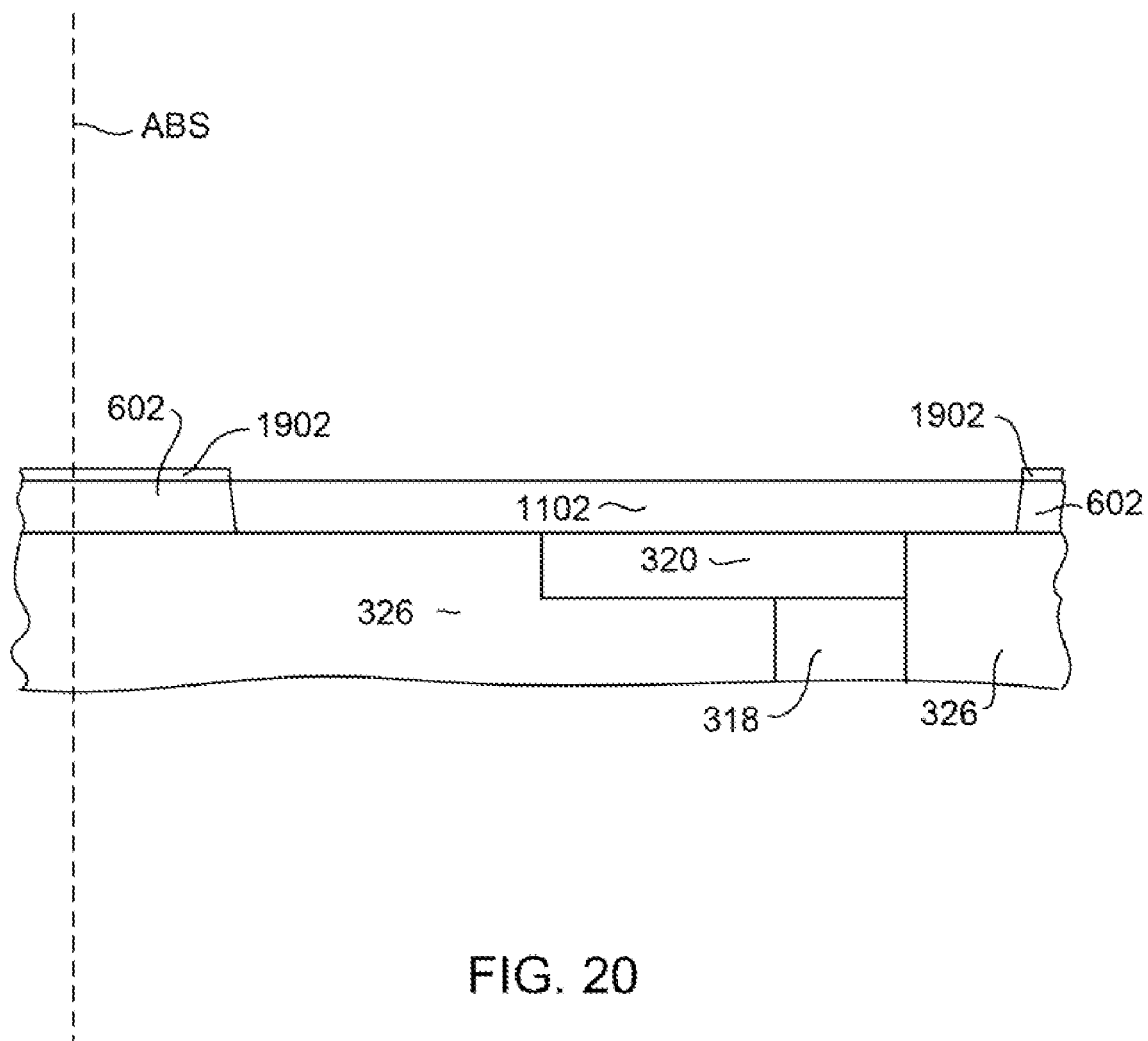

FIGS. 19-22 illustrate a method for manufacturing a write head according to an alternate embodiment of the invention. FIG. 19 shows a structure similar to that described in FIG. 14. However, in the structure shown in FIG. 19, the first CMP stop layer 1902 is constructed of a CMP resistant metal, such as Ir or Rh, while the second CMP stop layer 1904 is constructed of diamond like carbon (DLC). The process used to create the structure shown in FIG. 19 can be similar to the processes used to construct the structure of FIG. 14.

Then, a reactive ion etching (RIE) is performed to preferentially remove the second CMP stop layer 1902, leaving the first CMP stop layer 1902. In order to preferentially remove the second CMP stop layer 1904 without affecting the other layers, the RIE is preferably performed in an oxidizing (e.g., $O_2$ or $CO_2$) chemistry.

Figure 21:
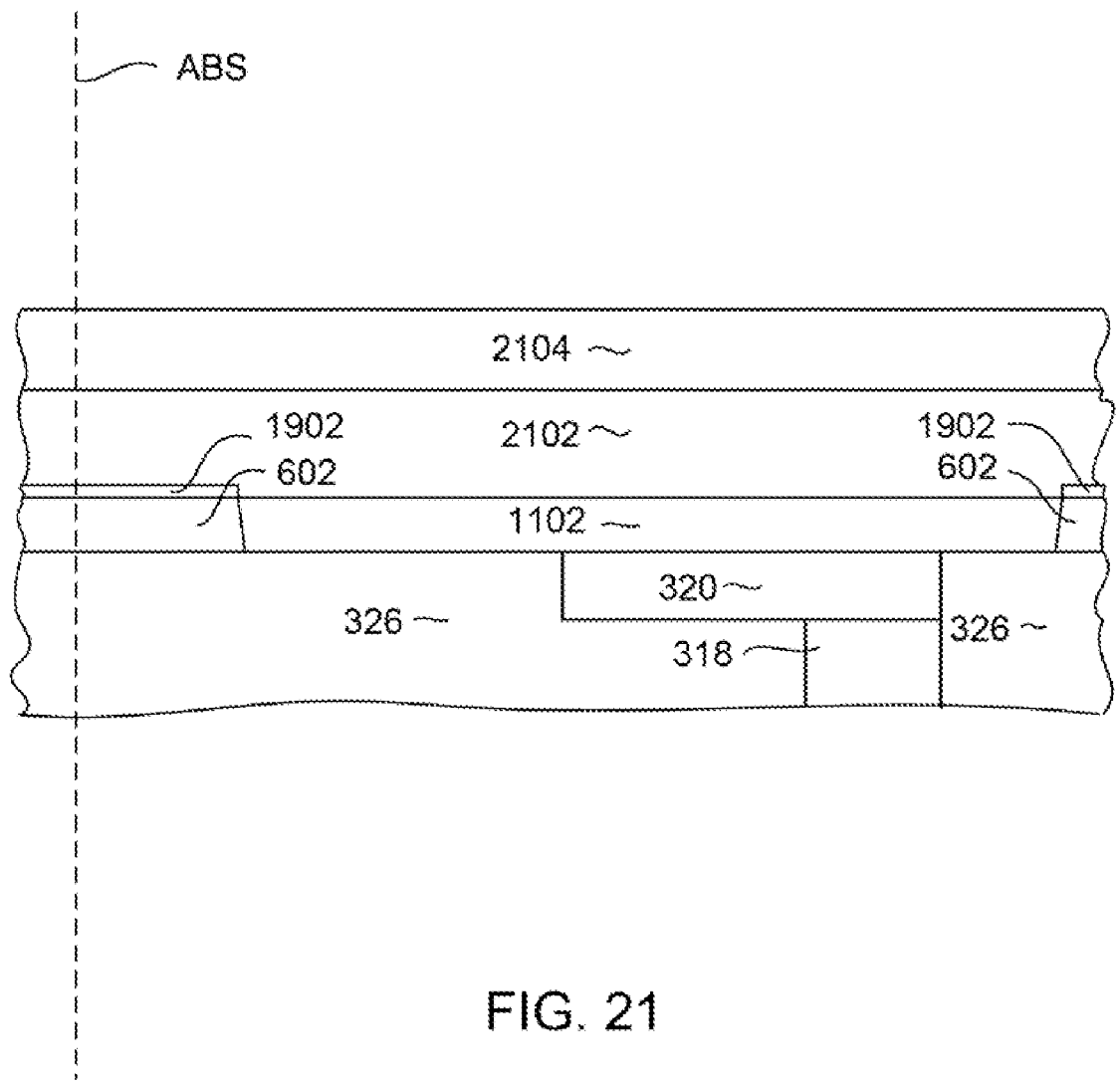
Figure 22:
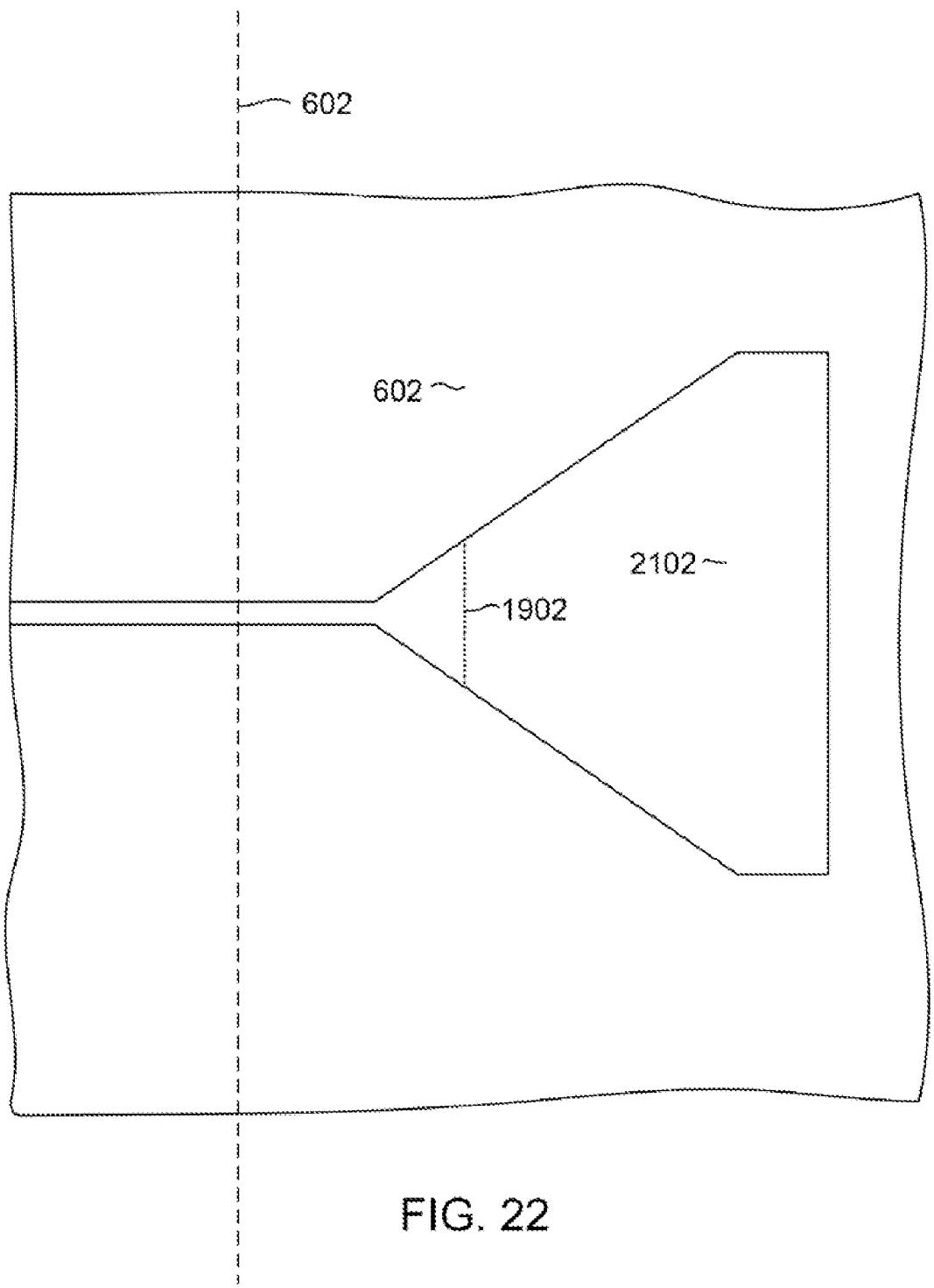

With reference to FIG. 21, a magnetic write pole material 2102 such as a laminate structure is deposited followed by a mask layer 2104. As with the above described embodiment, the magnetic write pole material 2102 can be a laminate structure including layers of high moment material separated by thin layers of non-magnetic material. Also, the mask layer 2104 can include a plurality of layers including a photoresist layer, one or more hard mask layers, an image transfer layer, and an anti-reflective coating layer.

The mask structure can be patterned as described above with regard to the previously described embodiment, and an ion milling process can be performed to remove portions of the magnetic write pole material 2102 that are not protected by the mask layers 2104, in order to form a write pole. As described above, the ion milling can be performed at one or more angles to form a beveled write pole. The resulting structure can be seen in FIG. 22 (after removal the mask structure 1204) which shows a top down view as seen from line 22-22 of FIG. 21. The first CMP stop layer 1902 remains beneath the write pole in the pole tip region, but is removed everywhere else by the ion milling operation. The back edge of the first CMP stop layer 1902 (which is hidden beneath the write pole material 2102) is shown in dotted line in FIG. 22. The presence of the first CMP stop layer 1902 under the write pole material 2102 during ion milling improves local topography and improves bevel angle formation of the sides of the write pole. The first CMP stop layer 1902 acts as an excellent marker for determining when the upper surface of the stepped pole structure 1102 has been reached during ion milling, thereby identifying the point at which ion milling should be terminated.

While various embodiments have been described, it should be understood that they have been presented by way of example only, and not limitation. Other embodiments falling within the scope of the invention may also become apparent to those skilled in the art. Thus, the breadth and scope of the invention should not be limited by any of the above-described exemplary embodiments, but should be defined only in accordance with the following claims and their equivalents.

What is claimed is:

1. A method for manufacturing a magnetic write head, comprising:
   providing a substrate;
   depositing a layer of dielectric material over the substrate;
   depositing a first CMP stop layer that is made of a material that is resistant to chemical mechanical polishing over the layer of dielectric material;
   forming a mask structure over the first CMP stop layer, the mask structure having an opening configured to define a stepped pole structure;
   transferring the image of the mask structure onto the underlying first CMP stop layer and the dielectric layer;
   depositing a magnetic material;
   depositing a second CMP stop layer made of a material that is resistant to chemical mechanical polishing over the magnetic material;
   after depositing the magnetic material and the second CMP stop layer, removing the mask structure; and
   after removing the mask structure, performing a chemical mechanical polishing on the magnetic material and on the first and second CMP stop layers.

2. The method as in claim 1 wherein the transferring the image of the mask structure further comprises performing an ion milling to remove portions of the first CMP stop layer that are not protected by the mask structure and continuing the ion milling to remove portions of the dielectric layer that are not protected by the mask structure.

3. The method of claim 1 wherein the dielectric layer comprises alumina.

4. The method of claim 1 wherein the first CMP stop layer comprises diamond like carbon (DLC).

5. The method of claim 1 wherein the first CMP stop layer comprises Rh, Ir or Ru.

6. The method of claim 1 wherein the second CMP stop layer comprises diamond like carbon (DLC).

7. The method of claim 1 wherein the first CMP stop layer comprises, diamond like carbon (DLC), Rh, Ir or Ru, and the second CMP stop layer comprises (DLC).

8. The method of claim 1 wherein the magnetic material comprises CoFe, CoFeN or $Ni_{22}Fe_{78}$.

9. The method of claim 1 wherein the substrate comprises a layer of magnetic material forming a shaping layer, and a non-magnetic layer surrounding the shaping layer.

10. The method of claim 1 wherein the dielectric layer is deposited to a thickness that defines stepped pole thickness.

11. The method of claim 1 wherein the dielectric layer is deposited to a thickness of 50-100 nm.

12. The method of claim 1 wherein the dielectric layer is deposited to a thickness that defines a stepped pole thickness and wherein the magnetic material is deposited to a thickness that is substantially equal to the thickness of the dielectric layer.

13. The method of claim 1 wherein the opening in the mask structure does not extend to a predetermined air bearing surface plane.

14. The method of claim 1 further comprising after performing the chemical mechanical polishing, forming a magnetic write pole over the remaining magnetic material and dielectric layer.

15. The method of claim 14 wherein the opening in the mask structure does not extend to a predetermined air bearing surface plane, and wherein the write pole extends past the predetermined air bearing surface plane.

16. The method as in claim 1 wherein the transferring the image of the mask structure further comprises performing a first material removal process to remove portions of the first CMP stop layer that are not protected by the mask structure, and then performing a second material removal process to remove portions of the dielectric layer that are not protected by the mask structure.

17. The method of claim 16 wherein the first and second material removal processes each comprise reactive ion etching.

18. The method of claim 16 wherein the first material removal process comprises ion milling, and the second material removal process comprises reactive ion etching in an oxidizing chemistry.

19. A method for manufacturing a magnetic write head, comprising:
   providing a substrate;
   depositing a layer of dielectric material over the substrate;
   depositing a first CMP stop layer that is made of a material that is resistant to chemical mechanical polishing over the layer of dielectric material, the first CMP stop layer being a non-magnetic metal;

forming a mask structure over the first CMP stop layer, the mask structure having an opening configured to define a stepped pole structure;

transferring the image of the mask structure onto the underlying first CMP stop layer and the dielectric layer;

depositing a magnetic material;

depositing a second CMP stop layer made of a material that is resistant to chemical mechanical polishing over the magnetic material, the second CMP stop layer comprising diamond like carbon (DLC);

after depositing the magnetic material and the second CMP stop layer, removing the mask structure;

after removing the mask structure, performing a chemical mechanical polishing polishing on the magnetic material and on the first and second CMP stop layers; and after removing the mask structure, performing a reactive ion etching to preferentially remove remaining portions of the second CMP stop layer while leaving the remaining portion of the first CMP stop layer intact.

20. The method of claim 19 further comprising, after performing the reactive ion etching to preferentially remove remaining portions of the second CMP stop layer, forming a magnetic write pole over the magnetic material and the first CMP stop layer.

21. The method as in claim 19 wherein the reactive ion etching is performing using a oxidizing chemistry.

* * * * *